United States Patent [19]

Glover

[11] Patent Number: 5,658,374
[45] Date of Patent: Aug. 19, 1997

[54] AQUEOUS LECITHIN-BASED RELEASE AIDS AND METHODS OF USING THE SAME

[75] Inventor: Daniel Glover, Brighton, Tenn.

[73] Assignee: Buckman Laboratories International, Inc., Memphis, Tenn.

[21] Appl. No.: 395,608

[22] Filed: Feb. 28, 1995

[51] Int. Cl.⁶ .................... C09D 5/00; C09D 191/00
[52] U.S. Cl. .................... 106/2; 106/173.01; 106/175.1; 106/203.1; 106/205.1; 106/205.2
[58] Field of Search ............... 106/2, 187, 189, 106/198, 203, 173.01, 175.1, 203.1, 205.1, 205.2

[56] References Cited

U.S. PATENT DOCUMENTS

| | | |
|---|---|---|
| 1,934,005 | 11/1933 | Rewald . |
| 4,073,411 | 2/1978 | Doumani . |
| 4,371,451 | 2/1983 | Scotti et al. ............... 252/305 |
| 4,686,119 | 8/1987 | Nojima et al. . |
| 4,857,126 | 8/1989 | Söremark et al. . |
| 5,034,097 | 7/1991 | Martinez et al. . |
| 5,223,095 | 6/1993 | Kinsley, Jr. . |
| 5,256,254 | 10/1993 | Pease et al. . |
| 5,302,330 | 4/1994 | Umansky et al. . |
| 5,328,567 | 7/1994 | Kinsley, Jr. . |
| 5,342,872 | 8/1994 | Huber . |
| 5,372,637 | 12/1994 | Dwight, Jr. . |
| 5,374,434 | 12/1994 | Clapp et al. ............... 426/116 |
| 5,376,320 | 12/1994 | Tiefenbacher et al. . |
| 5,387,750 | 2/1995 | Chiang . |
| 5,396,021 | 3/1995 | Clapp et al. ............... 106/2 |

FOREIGN PATENT DOCUMENTS

| | | |
|---|---|---|
| 1 539 762 | 1/1979 | United Kingdom . |
| WO95/04856 | 2/1995 | WIPO . |

OTHER PUBLICATIONS

Derwent Abstract 86–208920, Jun. 28, 1986.
Derwent Abstract No. 89–097387, Feb. 20, 1989.
Hiemenz, Principles Of Colloid and Surface Chemistry, Marcel Dekkar, Inc., NY, 1986.

*Primary Examiner*—David Brunsman
*Attorney, Agent, or Firm*—Armstrong, Westerman, Hattori, McLeland & Naughton

[57] ABSTRACT

An aqueous release aid composition is disclosed that comprises a stable emulsion of an alcohol, a fatty acid or oil, lecithin, a water soluble or water dispersible surfactant, and water. Methods of preparing such aqueous release aid compositions and methods of imparting release characteristics to various release surfaces and various viscous masses using the aqueous release aid compositions of the invention are also disclosed.

47 Claims, No Drawings

5,658,374

AQUEOUS LECITHIN-BASED RELEASE AIDS AND METHODS OF USING THE SAME

FIELD OF THE INVENTION

The present invention relates to aqueous lecithin-based release aids. More specifically, the present invention relates to stable aqueous lecithin-based release aids in the form of an emulsion. The present invention further relates to methods of imparting release characteristics to various viscous substances and release surfaces using these stable aqueous release aid emulsions.

BACKGROUND OF THE INVENTION

Lecithin is well known for its effectiveness as a release agent. Lecithin has provided release capabilities to the products and processes of many different industries, such as the pulp and paper making industry, the various mold making industries, e.g., for paper, plastic, composite material, cement:, clay, textile, rubber and ceramic molding, and the food industry, among others. For a discussion of the many properties and capabilities of Lecithin, see "The Lecithin Book. A Guide to Lecithin.", Central Soya, Chemurgy Division (June 1991), the disclosure of which is incorporated herein by reference.

Lecithin is generally used in combination with a solvent such as, for example, a fatty acid or an oil. The use of lecithin alone as a release agent, or in combination with a solvent, such as a fatty acid or oil, is described, for example, in U.S. Pat. Nos. 5,372,637, 5,034,097 and 5,328,567, the disclosures of which are incorporated herein by reference.

Lecithin alone, or in combination with a fatty acid or an oil, however, is an oil-based mixture. Neither lecithin alone, or an oil-based mixture of lecithin is capable of easily forming a stable aqueous composition. Many of the desired uses of a lecithin-based release aid composition however, are in aqueous-based products or processes which involve contact with water. Thus, a stable aqueous-based release aid composition that is dispersible in water is frequently the industry-needed or desired form of a release aid composition.

The industries that use release aid compositions have long faced the difficulty of having to prepare an aqueous-based emulsion from oil-based release aid compositions. The use of aqueous-based emulsions requires the preparation of the aqueous-based emulsions of the release aid compositions immediately prior to the use of the compositions. The process of preparing such aqueous-based emulsions is a complex process requiring special ingredients and proper blending and emulsifying. Thus, for many industries the process of preparing such emulsions is too complicated or expensive, or is at least seen as a difficult and complex process that is far from the industry's area of speciality.

For example, in the paper making industry, which uses release aids in the majority of their paper making processes and/or products, an aqueous-based release aid emulsion must be formed just prior to use and then immediately used before separation of the emulsion occurs. An additional complication to the process of preparing and using an aqueous emulsion of a release aid composition is that if the emulsion will not be used shortly after preparation, constant agitation is required in order to retain the emulsion and prevent separation of the oil and water emulsion components.

The characteristic separation of oil and water emulsions has complicated many uses of existing release aid compositions. Common uses, such as spraying or coating surfaces with release aid compositions, can be problematic because the emulsion components separate and the spraying or coating processes produce uneven coverage. In addition, due to such separation, it is difficult to achieve the desired dispersion of the emulsion in order to spray the composition onto various surfaces.

The complications regarding the lack of stability of aqueous-based release aid compositions have prevented industries from being able to purchase and store ready-to-use forms of aqueous release aid compositions. The availability of a stable aqueous-based release aid composition is therefore a desired product in many various industries because it would remove the complications and expenses surrounding the preparation of and use of aqueous-based release aid compositions.

Thus, there is an existing need and desire for stable aqueous release aid emulsions capable of providing release capabilities to a wide range of viscous substances and release surfaces.

SUMMARY OF THE INVENTION

It is therefore an object of the present invention to provide an aqueous lecithin-based release aid composition capable of existing as a stabilized emulsion.

It is also an object of the present invention to provide a water-based release aid composition containing lecithin.

It is another object of the present invention to provide a stabilized release aid emulsion that can be used as an emulsifiable concentrate capable of providing a stabilized dispersion upon dilution.

It is a further object of the present invention to provide a stabilized release aid composition which can be used by incorporation into a viscous substance or mass, thereby providing release capability to the substance or mass, and also by application to a release surface, thereby providing release characteristics to the surface.

It is still another object of the present invention to provide a food grade stabilized release aid composition.

It is a still further object of the present invention to provide a sprayable release aid emulsion.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the written description and appended claims.

The foregoing objects have been accomplished in accordance with this invention by providing a water-based release aid composition containing an alcohol, a fatty acid or an oil, lecithin, a water soluble or water dispersible surfactant, and water.

The present invention also embodies a method of imparting release characteristics to a release surface. Such a method includes the step of applying the release aid composition to the release surface in an amount sufficient to afford release of a mass in contact with the release surface.

A further embodiment of the present invention includes a method of imparting release characteristics to a viscous mass. Such a method includes the step of adding the release aid composition to the viscous mass in an amount sufficient to afford release of the viscous mass from a release surface in contact with the mass.

The present invention also relates to a method for the preparation of a water-based release aid composition. The steps of this method include forming a homogenous mixture of an anticaking or antigelling agent, an alcohol, a thickener, and water, to which a surfactant, a fatty acid and lecithin are added, thereby producing an emulsion. A preferred embodiment of this method includes the following steps: a) in a first container, dispersing an anticaking or antigelling agent in water by stirring to form a mixture; b) in a second container, dispersing a thickener in an alcohol by stirring to form a slurry; c) subsequently stirring the slurry into the mixture until a homogenous mixture is formed; d) successively adding a water soluble or water dispersible surfactant, a fatty acid and lecithin, with stirring until dispersion is achieved between each addition; and e) stirring the homogenous mixture until an emulsion is formed. The emulsion formed is preferably a smooth, opaque, white emulsion.

It is to be understood that both the foregoing general description and the following detailed description are exemplary and explanatory only and are intended to provide further explanation of the present invention, as claimed.

DETAILED DESCRIPTION OF THE INVENTION

An important advantage of the present invention is that the release aid composition is water-based, thus affording its use as a release aid in multiple industry uses. Another advantage of the present invention is the stability of the aqueous release aid composition in the form of an emulsion. This ready-to-use characteristic of an emulsified aqueous release aid composition also affords multiple industry use of the present invention. An additional advantage of the present invention is the ability to use the stabilized emulsion as a concentrate which, upon dilution with water, provides a stabilized dispersion. This quality of the present aqueous release aid emulsions enables them to be used at any desired concentration, thus further broadening the potential uses of the present invention. The ability to produce a stabilized dispersion from the stable emulsions of the present invention affords the desired capability of using the emulsions, or diluted emulsion, as a spray.

The water-based release aid compositions of the present invention comprise an alcohol, a fatty acid or an oil, lecithin, a water soluble or water dispersible surfactant, and water. The amounts of each component described below are expressed in percentages relative to the total weight of the composition.

The alcohols that may be used in accordance with the present invention preferably include, but are not limited to, glycols.

The alcohol component preferably functions as a coupling agent which provides freeze-thaw ability. Thus, any alcohol imparting this ability to the compositions of the present invention could be used in accordance with present invention. Preferably, the alcohol is ethanol or propanol, and the like. If a glycol is used, the glycol is preferably ethylene glycol, propylene glycol, diethylene glycol or dipropylene glycol, and the like.

The alcohol component is preferably present in an amount ranging from about 1% to about 15% by weight, and more preferably about 2% to about 8% by weight, relative to the total weight of the composition.

The fatty acid or oil component used in the present invention preferably functions as a solvent for the lecithin, and is more preferably synergistic with the lecithin, in the sense that a good dispersion of the lecithin is achieved therewith. A fatty acid or an oil alone, or a mixture thereof, or any combination thereof may be used in accordance with the present invention. According to the present invention, any naturally derived fatty acid or oil may be used. Preferably, the fatty acid or oil is unsaturated, i.e., is liquid at ambient temperatures. Preferably, the fatty acid is a $C_8$ to $C_{20}$ fatty acid, and more preferably, the fatty acid is oleic acid, linoleic acid or TOF acid, but is not limited thereto. The fatty acid or oil components that may be used in the present invention are commercially available, for example, from the Humko Chemical Division of Witco Corporation, Memphis, Tenn.

The fatty acid or oil component is preferably present in an amount ranging from about 5% to about 40% by weight, and more preferably about 10% to about 30% by weight, relative to the total weight of the composition.

The lecithin component of the present invention preferably functions as the active ingredient in the release aid composition described herein. Lecithin, in its various mixtures, is sold under such commercial series names as Centrolene, Centrophase, and Centrophil. Preferably, the series Centrophase HR is used because of its characteristic resistance to heat. These commercial products are available, for example, from Central Soya Company, Inc., Fort Wayne, Ind.

The lecithin component is preferably present in an amount ranging from about 3% to about 30% by weight, and more preferably in an amount ranging from about 5% to about 10% by weight, relative to the total weight of the composition.

The water soluble or water dispersible surfactant component of the present invention preferably functions as a surface active agent, an emulsifier, a stabilizer, and/or a dispersant. Any water soluble or water dispersible surfactant which imparts these characteristics could thus be used according to the present invention. Preferably, the water soluble or water dispersible surfactant is polymeric. The water soluble or water dispersible polymeric surfactant component is preferably chosen from a nonionic polymeric surfactant. Preferably, the nonionic polymeric surfactant is chosen from water soluble block copolymers. More preferably, the nonionic surfactant is a water soluble block copolymer of ethylene oxide and propylene oxide, a butoxy block copolymer of ethylene oxide and propylene oxide, a polyethylene glycol ester or an ethoxylated alcohol. An anionic surfactant may also be used in accordance with the present invention. If an anionic surfactant is used, dioctyl sulfosuccinate (DOSS) is preferably used. The above-mentioned surfactants are commercially available, for example, from Stepan Chemical Company, Northfield, Ill.; Harcros; and BASF, Parsippany, N.J.

The water soluble or water dispersible surfactant component of the present invention is preferably present in an amount ranging from about 0.2% to about 7% by weight, and more preferably about 1% to about 4% by weight, relative to the total weight of the composition.

In addition to the above components, the release aid composition includes water. The compositions of the present invention preferably include at least approximately 45-50% water, so as to ensure formation of an oil-in-water emulsion.

The release aid composition of the present invention may optionally contain an anticaking or antigelling agent for stability of the composition. If an anticaking or antigelling agent is used, it is preferable to use magnesium aluminium silicate, for example, Veegum, which is commercially available from R. T. Vanderbilt & Co., Norwalk, Conn. It is also possible to use calcium silicate or aluminum oxide as an anticaking or antigelling agent. The anticaking or antigelling agent, if used, is preferably present in an amount ranging from about 0% to about 3% by weight, more preferably about 0.1% to about 1.0% by weight, relative to the total weight of the composition.

The release aid compositions of the present invention may also contain a thickener which would impart the additional characteristics of viscosity modification, emulsification and/ or stabilization. If a thickener is included, it is preferable to use a gum, an alginate or a cellulose derivative. If a gum is used, it is preferable to use xanthan gum. If a cellulose derivative is used, it is preferable to use carboxy methyl cellulose (CMC). A thickener, if used, is preferably present in an amount ranging from about 0% to about 3% by weight, more preferably about 0% to about 0.5% by weight, relative to the total weight of the composition.

In addition, the release aid compositions of the present invention may contain various preservatives as needed or desired. Such preservatives may function as antioxidants, freshness preservers, and antibacterials, among others. Typical preservatives include Kathon®, BHT, BHA, TBHQ and sodium benzoate, and the like. As a preservative, it is preferable to use Busan® 1078, which is manufactured by Buckman Laboratories International, Inc. and is a microbicide.

The desired viscosity for the present release aid compositions is such that the compositions may be easily pumped and flow freely. Such characteristics greatly enhance the ability to use the present compositions in the form of a spray.

One of the unique features of the present invention is that the release aid compositions form aqueous-based emulsions that are stable at room temperature and from temperatures of from about 8° C. to about 50° C. for extended periods of time. The stability of the aqueous-based emulsions of the present invention at room temperature and 8° C. is characterized by the lack of separation or other physical defects, such as gelling, precipitation, flocculation, sedimentation and discoloring of the emulsion for at least a period of approximately 4 months, more preferably, a period of approximately 6 months to a year. It is noted that at 8° C., the stability of the emulsions should last as long as that at room temperature, but may last for longer periods of time. At 50° C., the stability of the aqueous-based emulsions of the present invention is characterized by the lack of separation or other physical defects for at least 14 days, after which signs of accelerated aging may be seen at such temperatures.

The aqueous-based emulsions of the present invention are also unique because they have excellent freeze-thaw capabilities. For example, at −15° C., the stability of the aqueous-based emulsions of the present invention is characterized by the fact that the emulsion will freeze at such a temperature, but upon thawing, will return to a homogenous state, and remain stable at room temperature for at least one month.

The stability of the aqueous-based emulsions of the present invention is a definite advantage over existing emulsions which require constant agitation in order to remain in the form of an emulsion (i.e., to prevent separation). Existing emulsions do not store well for any length of time due to their separation and the occurrence of physical defects, and thus are difficult to purchase in the desired commercially ready-to-use form.

In addition to the stability of the aqueous-based emulsions of the present invention, the emulsions of the present invention are capable of being prepared in concentrated form that is capable of being diluted with water to form a stable ready-to-use dilution. In preparing a dilution of the present emulsions, it is possible to dilute the emulsions to a concentration of 1% in water. Such a dilution preferably remains stable, i.e., no physical separation or other physical defects, for at least 3 hours.

The stable aqueous-based release aid emulsions of the present invention can be used in multiple industries and for multiple uses. For a discussion of the multiple uses for an aqueous-based release aid compositions, see generally U.S. Pat. Nos. 5,372,637, 5,302,330 and 5,342,872, the disclosures of which are incorporated herein by reference.

Additional advantages of the release aid compositions of the present invention for their many industrial uses are that they have low foaming potential, and can contain no SARA 313 reportable materials and no volatile organics.

In particular, the emulsions of the present invention may be added directly, i.e., without dilution, to the wet end of a paper making machine. The emulsions of the present invention are preferably added to a paper making machine at a concentration of about 0.08% to about 0.15% based on the total weight of the dry fiber, depending on the severity of the adhesion or "sticking" problem. The addition of this amount of the aqueous-based emulsions of the present invention to a paper making process should impart excellent release capability to the paper material from the various surfaces, i.e., the press rolls, the yankee rollers, the couch rolls, the dryer cans, etc., contacted by the paper making material. For a discussion of the use of a release aid in the wet end of a paper making machine, see generally U.S. Pat. Nos. 4,686,119 and 4,857,126, the disclosures of which are incorporated herein by reference.

The aqueous-based emulsions of the present invention can also be used in the dry end of a paper making machine by being applied directly, or being diluted and then applied, e.g., by spraying, onto the various surfaces, i.e., the calendar stacks, the dryer cans, the couch or other rolls, which are involved in a paper making machine where adhesion of "stickies" is a problem. For a discussion of the use of a release aid in the dry end of a paper making machine, see generally U.S. Pat. No. 5,256,254, the disclosure of which is incorporated herein by reference.

Another industry in which the aqueous-based emulsions of the present invention can be of advantage is in the food industry. The present inventive emulsions can be composed of all food grade quality components. Release aid compositions can be used in the food industry in food preparation, i.e., cooking, baking, etc., and also in food processing, i.e., in mass manufacturing of food products. For examples of uses of release aid compositions in the food industry, see generally U.S. Pat. No. 5,374,434 directed to usage in a food release composition and U.S. Pat. No. 5,376,320 directed to usage in food grade molds, the disclosures of which are incorporated herein by reference.

It is also within the contemplated bounds of the present invention that the aqueous-based emulsions be used in molding processes, for example with respect to paper, plastics, composite materials, cement, clay, textiles, rubber and ceramics, and in any additional industrial processes involving surfaces or substrates in need of release capabilities. The release aid compositions of the present invention can be used in molding processes as a mold release aid, i.e., allowing a molded material to be easily removed from a mold and to prevent sticking of the material to the mold, such as, in the mold preparation process of U.S. Pat. 5,387,750, the disclosure of which is incorporated herein by reference.

It is also within the contemplated bounds of the present invention that the aqueous-based emulsions be used in viscous masses, e.g., pulp and paper slurries, paper, plastic, composite material, cement, clay, textile, rubber and ceramic compositions and/or slurries, prepared during various industry processes which are in need of release capabilities for release from surfaces, e.g., molds, rollers, and various other substrates, coming into contact with such masses, such as, for example, paper, plastic, composite material, cement, clay, textile, rubber and ceramic material to be molded. For a general discussion of the use of aqueous compositions as mold release agents, see U.S. Pat. No. 5,372,637, the disclosure of which is incorporated herein by reference.

The release capabilities provided by the release aid compositions described above have been confirmed using standard laboratory techniques as illustrated below. The present invention will be further clarified by the following examples, which are intended to be purely exemplary of the invention.

EXAMPLES

Example 1

A composition according to the following formula was prepared:

| Component | Percentage by Weight of Total Composition |
| --- | --- |
| water | 66.37 |
| Veegum - magnesium aluminum silicate from R. T. Vanderbilt & Co. | 0.22 |
| propylene glycol | 2.2 |
| Toximul 8320 - butoxy block copolymer of ethylene oxide and propylene oxide from Stepan Chemical Co. | 1.1 |
| xanthan gum | 0.11 |
| Industrene 106 - oleic acid from Witco | 24.0 |
| Centrophase HR - lecithin, roughly 60% active from Central Soya | 6.0 |
| Busan® 1078 - Kathon® microbicide from Buckman International Laboratories | 50 ppm |

Procedure:

In a first container, the anticaking agent, Veegum, was dispersed in water to form a mixture. In a second container, the thickener, xanthan gum, was dispersed in the alcohol, propylene glycol, to form a slurry. The slurry was then stirred into the mixture until a homogenous mixture was formed. To the homogenous mixture was added the surfactant, a butoxy block copolymer of ethylene oxide and propylene oxide, followed by stirring until complete dispersion was achieved. The fatty acid/oil component., oleic acid, was then added, followed by stirring until dispersion. Finally the lecithin and a microbicide, Busan® 1078, were added and the final mixture was stirred until a stable emulsion was formed which was smooth, opaque and white.

Example 2

A composition similar to that prepared in Example 1 was prepared according to the same procedure and amounts used in Example 1, except that Tergitol XD, a butoxy block copolymer of ethylene oxide and propylene oxide available from Union Carbide, was used instead of the butoxy block copolymer Toximul 8320.

The composition formed was a stable, smooth, opaque, white emulsion similar to the emulsion produced in Example 1.

Example 3

A composition similar to that prepared in Example 1 was prepared according to the same procedure and amounts used in Example 1, except that Toximul 8320 was replaced with Pluronic L-64, a block copolymer of ethylene oxide and propylene oxide available from BASF. Pluronic L-64 was used in an amount which constituted 2.0% of the total weight of the composition, and the water component was thus reduced to 165.47% of the total weight of the composition.

The composition formed was a stable, smooth, opaque, white emulsion similar to the emulsion produced in Example 1.

Example 4

A composition similar to that prepared in Example 1 was prepared according to the same procedure and amounts used in Example 1, except that Toximul 8320 was replaced with a combination of Chemax E-600 ML, a polyoxyethylated (14) coco fatty acid, and Chemax PEG-600 DT, a polyethylene glycol MW 600 diester with tall oil fatty acid, both available from Chemax Inc., Greenville, S.C. The combination of Chemax E-600 ML and Chemax PEG-600 DT was used in a total amount which constituted 4.0% of the total weight of the composition, and the water component was thus reduced to 63.47% of the total weight of the composition. The combination of Chemax E-600 ML and Chemax PEG-600 DT was made up of 75% ML (monolaurate) component and 25% DT (ditallate) component.

The composition formed was a stable, smooth, opaque, white emulsion similar to the emulsion produced in Example 1.

Example 5

The compositions of Examples 1–4 were prepared in sufficient quantities to prepare therefrom four samples of each composition so as to enable each composition to be evaluated for stability at four different temperatures.

The compositions of Examples 1–4 were evaluated for stability at temperatures of room temperature, 50° C., 8° C., and −15° C. Each sample was visually inspected at periodic intervals to determine if separation of the emulsion components had occurred and to determine if physical defects had occurred to the emulsion. The physical defects specifically looked for were gelling, flocculation, sedimentation, and discoloring.

With respect to the four samples evaluated at −15° C., these samples were allowed to freeze overnight (approximately 12 hours) and were then allowed to warm to room temperature. Upon reaching room temperature, each sample was inspected to see if the emulsion had remained intact following the freezing and subsequent thawing steps. If the emulsion remained intact, the stability of these samples was further evaluated to determine if such emulsions remained stable for any length of time.

Results:

Each of the four samples evaluated at room temperature remained stable for a period of at least four months. Each of the four samples evaluated at 8° C. also remained stable for a period of at least four months.

Each of the four samples evaluated at 50° C. remained stable for a period of at least 14 days before signs of accelerated aging or physical defects were observed.

Each of the four samples evaluated at − 15° C. remained intact following the freezing and subsequent thawing operations. Following their thawing to room temperature, these four samples remained stable for at least one month before signs of separation or physical defects were observed.

Example 6

Each of the compositions of Examples 1-4 were evaluated for their ability to be diluted with water.

One gram of each composition was combined with 99 grams of water and shaken or stirred until dispersed. Once a dispersion was achieved, each sample was evaluated to determine the length of time the sample remained dispersed.

Each of the four compositions formed a uniform dispersion which lasted for at least three hours before separating into components, e.g., by one component floating to the top or agglomerating on the bottom. Each sample was determined to constitute an acceptable dilution.

Example 7

The composition of Example 1 was used to evaluate the release aid characteristics of the compositions in accordance with the present invention.

Pulping was performed at 0.5% consistency for 1 hour. 20% by weight polyvinyl alcohol (PVOH) was then added to the pulper in an amount corresponding to 50 grams of pulp per 10 grams of PVOH. A pulp slurry was produced.

This slurry was placed into a hand sheet mold and release aid compositions according to the present invention were added to the hand sheet mold in the amounts listed below. The hand sheets were then pressed and placed onto aluminum foil and then dried over a steel can. Removal of the sheets from the aluminium foil was attempted with the following results.

Results:

A. Sheets made with no release aid composition (control):

The hand sheets could not be removed from the aluminum foil without damaging the hand sheet.

B. Sheets made with 40 ppm (fiber weight) release aid composition:

The hand sheets did stick to the aluminium foil but were easily removed from the aluminium foil with no damage to the hand sheets.

C. Sheets made with 80 ppm (fiber weight) release aid composition:

The hand sheets did not even stick to the aluminium foil. The hand sheets slid off the aluminium foil once dried.

The above results demonstrate, based on standard laboratory techniques, that the release aid compositions according to the present invention provide the desired release capabilities to the release surface, i.e., the aluminium foil, at a concentration of 40 ppm, based on fiber weight.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A stable water-based release aid composition comprising:
   a) an alcohol selected from ethanol and propanol;
   b) a fatty acid or an oil;
   c) lecithin;
   d) a water soluble or water dispersible surfactant;
   e) water; and
   f) a thickener.

2. The stable water-based release aid composition of claim 1, wherein the stable release aid composition forms an aqueous-based emulsion that is stable from a temperature of from about 8° C. to about 50° C.

3. The stable release aid composition of claim 1, wherein the release aid composition forms an aqueous-based emulsion that is stable for at least a period of approximately four months.

4. The release aid composition of claim 1, which is in the form of an emulsion.

5. The release aid composition of claim 1, which is an emulsifiable concentrate capable of providing a stabilized dilution in water.

6. The release aid composition of claim 1, which is stable at room temperature.

7. The release aid composition of claim 1, which is stable at a temperature of from about 8° C. to about 50° C.

8. A water-based release aid composition comprising;
   a) an alcohol selected from ethanol and propanol;
   b) a fatty acid;
   c) lecithin;
   d) a water soluble or water dispersible surfactant; and
   e) water.

9. The water-based release aid composition of claim 8, wherein the water-based release aid composition forms an aqueous-based emulsion that is stable from a temperature of from about 8° C. to about 50° C.

10. The water-based release aid composition of claim 8, wherein the release aid composition forms an aqueous-based emulsion that is stable for at least a period of approximately four months.

11. The release aid composition of claim 8, wherein said fatty acid is a naturally derived fatty acid.

12. The release aid composition of claim 11, wherein said naturally derived fatty acid is an unsaturated fatty acid.

13. The release aid composition of claim 8, wherein said fatty acid is a $C_8$–$C_{20}$ fatty acid.

14. The release aid composition of claim 8, wherein said fatty acid is selected from the group consisting of oleic acid, linoleic acid, and tall oil fatty acid.

15. A water-based release aid composition comprising:
   a) an alcohol;
   b) a fatty acid or an oil;
   c) lecithin;
   d) a water soluble or water dispersible surfactant;
   e) water; and
   f) a thickener selected from the group consisting of a gum other than an alginate, an alginate, and a cellulose derivative.

16. The release aid composition of claim 15, wherein said gum is a xanthan gum.

17. The release aid composition of claim 15, wherein said cellulose derivative is carboxy methyl cellulose.

18. The water-based release aid composition of claim 15, wherein the water-based release aid composition forms an aqueous-based emulsion that is stable from a temperature of from about 8° C. about 50° C.

19. The water-based release aid composition of claim 15, wherein the release aid composition forms an aqueous-based emulsion that is stable for at least a period of approximately four months.

20. The release aid composition of claim 15 further comprising an anticaking or antigelling agent.

21. The release aid composition of claim 20, wherein said anticaking or antigelling agent is selected from the group consisting of magnesium aluminum silicate, calcium silicate, and aluminium oxide.

22. The release aid composition of claim 20, wherein said anticaking or antigelling agent is present in an amount ranging from more than 0% to about 3% by weight relative to the total weight of the composition.

23. The release aid composition of claim 22, wherein said anticaking or antigelling agent is present in an amount ranging from about 0.1% to about 1.0% by weight relative to the total weight of the composition.

24. The release aid composition of claim 15 further comprising a preservative.

25. The release aid composition of claim 24, wherein said preservative is selected from the group consisting of 5-chloro-2-methyl 4-isothiazolin-3-one, butylated hydroxy toluene, butylated hydroxy anisole, tertiary-butyl-hydroxyaquinone, and sodium benzoate.

26. The release aid composition of claim 15 wherein said alcohol is a glycol.

27. The release aid composition of claim 26, wherein said glycol is selected from the group consisting of propylene glycol, ethylene glycol, dipropylene glycol and diethylene glycol.

28. The release aid composition of claim 15, wherein said alcohol is selected from the group consisting of ethanol and propanol.

29. The release aid composition of claim 15, wherein said fatty acid or oil is a naturally derived fatty acid or oil.

30. The release aid composition of claim 29, wherein said fatty acid or oil is an unsaturated fatty acid or oil.

31. The release composition of claim 30, wherein said fatty acid is selected from the group consisting of oleic acid, linoleic acid, and tall oil fatty acid.

32. The release aid composition of claim 15, wherein said fatty acid is a $C_8$-$C_{20}$ fatty acid.

33. The release aid composition of claim 15, wherein said water soluble or water dispersible surfactant is polymeric.

34. The release aid composition of claim 33, wherein said water soluble or water dispersible polymeric surfactant is nonionic.

35. The release aid composition of claim 34, wherein said nonionic polymeric surfactant is selected from the group consisting of water soluble block copolymers of ethylene oxide and propylene oxide, butoxy block copolymers of ethylene oxide and propylene oxide, polyethylene glycol esters, and ethoxylated alcohols.

36. The release aid composition of claim 15, wherein said water soluble or water dispersible surfactant is anionic.

37. The release aid composition of claim 36, wherein said anionic surfactant is dioctyl sulfosuccinate.

38. The release aid composition of claim 15, wherein said alcohol is present in an amount ranging from about 1% to about 15% by weight relative to the total weight of the composition.

39. The release aid composition of claim 38, wherein said alcohol is present in an amount ranging from about 2% to about 8% by weight relative to the total weight of the composition.

40. The release aid composition of claim 15, wherein said fatty acid or oil is present in an amount ranging from about 5% to about 40% by weight relative to the total weight of the composition.

41. The release aid composition of claim 40, wherein said fatty acid or oil is present in an amount ranging from about 10% to about 30% by weight relative to the total weight of the composition.

42. The release aid composition of claim 15, wherein said lecithin is present in an amount ranging from about 3% to about 30% by weight relative to the total weight of the composition.

43. The release aid composition of claim 42, wherein said lecithin is present in an amount ranging from about 5% to about 10% by weight relative to the total weight of the composition.

44. The release aid composition of claim 15, wherein said water soluble or water dispersible surfactant is present in an amount ranging from about 0.2% to about 7% by weight relative to the total weight of the composition.

45. The release aid composition of claim 44, wherein said water soluble or water dispersible surfactant is present in an amount ranging from about 1% to about 4% by weight relative to the total weight of the composition.

46. The release aid composition of claim 15, wherein said thickener is present in an amount ranging from more than 0% to about 3% by weight relative to the total weight of the composition.

47. The release aid composition of claim 46, wherein said thickener is present in an amount ranging from more than 0% to about 0.5% by weight relative to the total weight of the composition.

* * * * *